United States Patent
Eckhardt et al.

(10) Patent No.: US 10,094,726 B2
(45) Date of Patent: Oct. 9, 2018

(54) MEMBRANE ISOLATED, GEL-FILLED FORCE SENSOR

(71) Applicant: Honeywell International Inc., Morris Plains, NJ (US)

(72) Inventors: Todd Eckhardt, Westerville, OH (US); Jim Machir, Columbus, OH (US); Ron Myers, Dublin, OH (US)

(73) Assignee: Honeywell International Inc., Morris Plains, NJ (US)

( * ) Notice: Subject to any disclaimer, the term of this patent is extended or adjusted under 35 U.S.C. 154(b) by 71 days.

(21) Appl. No.: 15/421,953

(22) Filed: Feb. 1, 2017

(65) Prior Publication Data

US 2018/0217018 A1    Aug. 2, 2018

(51) Int. Cl.
  *G01L 7/00* (2006.01)
  *G01L 19/06* (2006.01)
  *G01L 9/00* (2006.01)

(52) U.S. Cl.
  CPC ........ *G01L 19/0645* (2013.01); *G01L 9/0048* (2013.01)

(58) Field of Classification Search
  None
  See application file for complete search history.

(56) References Cited

U.S. PATENT DOCUMENTS

| | | | |
|---|---|---|---|
| 5,456,253 A | 10/1995 | Steuer et al. | |
| 5,461,922 A | 10/1995 | Koen | |
| 6,089,106 A * | 7/2000 | Patel | B60N 2/002 177/144 |
| 6,282,966 B1 | 9/2001 | Probst et al. | |
| 2009/0308170 A1* | 12/2009 | Broden | G01L 19/0046 73/723 |
| 2011/0079086 A1* | 4/2011 | Romo | G01L 19/146 73/756 |
| 2014/0090476 A1* | 4/2014 | Miller | G01L 19/0046 73/706 |
| 2015/0020600 A1* | 1/2015 | Eriksen | G01L 19/0645 73/706 |
| 2015/0082893 A1* | 3/2015 | Haywood | G01L 9/0041 73/723 |

* cited by examiner

*Primary Examiner* — Andre Allen
(74) *Attorney, Agent, or Firm* — Honeywell International Inc.

(57) ABSTRACT

Embodiments generally relate to assembly and methods for detecting force. A force sensor assembly may comprise a sense element, an isolation medium, a thin membrane, and a substrate. Typically, the sense element may be located adjacent to the substrate, the isolation medium may be located adjacent to the sense element, and the thin membrane may be located adjacent to the isolation medium. Generally, the thin membrane may be configured to provide a shield between an external medium and the isolation medium and transfer a force from the external medium to the isolation medium. In this manner, the isolation medium may be configured to transfer the detected force to the sense element. The sense element may electrically communicate the force data as output signals to the electrical traces on the substrate.

20 Claims, 4 Drawing Sheets

MEMBRANE ISOLATED, GEL-FILLED FORCE SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various types of sensors are commonly used to sense environmental parameters such as pressure, temperature, humidity, flow, thermal conductivity, gas concentration, light, magnetic fields, electric fields, as well as many other environmental parameters. Such sensors may be used in a wide variety of applications including, for example, medical applications, flight control applications, industrial process applications, combustion control applications, weather monitoring applications, water metering applications, as well as many other applications.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to force sensors commonly used to sense parameters such as pressure, temperature, humidity, flow, thermal conductivity, gas concentration, light, magnetic fields, electric fields, as well as many other parameters. Such sensors may be used in a wide variety of applications including, for example, medical applications, flight control applications, industrial process applications, combustion control applications, weather monitoring applications, water metering applications, as well as many other applications. Force sensor assemblies may comprise a sense element (e.g. force sensor) separated from an external medium by an isolation medium such as a gel. Typically, the isolation medium may make direct contact with the external medium to sense parameters, for example, a change in force/pressure. However, in some applications, for example the medical industry, the isolation medium may require a Food and Drug Administration (FDA) certification before it may contact the external medium. Typically, FDA certification is required to ensure the isolation medium is safe for contact with the external medium (e.g. bodily fluids, blood, milk, drugs, etc.) because medical applications generally require invasive pressure sensing and/or sensing of various kinds of fluids. Typically, to use the force sensors with varying external mediums, the user may have to frequently change the isolation medium (since each individual isolation medium is not compatible with every type of external medium). In other words, the user may have to implement various different FDA certified isolation mediums and, as per regulation, gain recertification of the FDA certified isolation medium periodically (e.g. yearly). In the case that an FDA certified isolation medium does not pre-exist, the user may have to incur costs to develop/test solutions which comply with FDA regulations. Typically, product development/testing may have long development cycle times, increased development costs, potential sacrifices to force sensor performance, as well as other drawbacks. Additionally, changing isolation mediums may neither be cost effective (because FDA certified isolation mediums are, generally, expensive) nor time efficient (because obtaining FDA certification consists of a long waiting time/period).

Conventionally, users may choose to incur the extra costs and inconvenience to ensure the isolation medium is FDA certified and/or the user may opt for fully media isolated sensors, non-contact sensing (e.g. through a bladder), and other such methods. To address these drawbacks, a non-contact method (e.g. no contact between the isolation medium and the external medium) for pressure/force sensing and/or the sensing of fluids is disclosed herein. In the disclosed embodiments, users can be provided with the ability to isolate the external medium from the sensing technology (e.g. force sensor) using a thin membrane of a known/pre-existing material (for example, silicone elastomers, fluorosilicone elastomers, PDMS (polydimethylsiloxane) membrane barriers, and several other membrane materials). In this manner, the material compatibility issues can be fully addressed by providing a compatible membrane material with pre-existing data to establish suitability for various applications. In the disclosed embodiments, the membrane accelerates the user design cycle time (e.g. time required to find/procure a FDA certified isolation medium), reduces user costs (e.g. costs associated with product development/testing), and enables the force sensor manufacturers' to provide the user with a known performance level (by taking responsibility for sealing the isolation medium).

Some embodiments relate to a force sensor. Typically, a force sensor may consist of a force sensor assembly comprising a sense element, an isolation medium, and a substrate. Typically, the sense element may be electrically connected to electrical traces located on the substrate. Additionally, the isolation medium may interface with the substrate and the sense element. During use, when the isolation medium is pressed against an external medium, the force (from pressing the isolation medium against the external medium) may be transmitted to the isolation medium causing at least a portion of the sense element to deflect. The sense element may generate an output signal in response to the deflection. Typically, the output signal may provide data such as a force level and/or the relative rate of change in force. Additionally, in some embodiments, the output from the sense element can be used to issue a warning or to take action if/when a certain threshold level is reached. Additionally, the disclosed embodiments may comprise a thin membrane placed over the top of the isolation medium to isolate the isolation medium from the external medium. In some embodiments, the force sensor assembly may further comprise a secondary seal placed between the thin membrane and the external medium to prevent fluid leakage and/or a diaphragm. Disclosed herein are exemplary embodiments that allow for optional removable or permanent attachment of a thin membrane to a force sensor assembly thereby reducing costs and increasing convenience. Additionally, disclosed herein are exemplary embodiments that allow for optional attachment of an external attachment element to the aforementioned force sensor assembly.

In some embodiments, the force sensor assembly may comprise permanent attachment of the thin membrane to isolate the external medium from the isolation medium. Typically, the force sensor assembly may comprise a thin membrane, a sense element, an isolation medium, a substrate, a secondary seal, and a support structure. Typically, the support structure may be affixed to a first side of the substrate and may comprise a central aperture. The central aperture may comprise the isolation medium, and typically, the isolation medium may be packed tightly within the central aperture and slightly project outwards from the central aperture. Typically, the isolation medium may be a standard, low-cost gel which may be suitable for various applications. In conventional applications, the isolation medium may have direct contact with an external medium making it difficult to reuse in various applications and resulting in extra time and money to find compatible isolation mediums which comply with FDA regulations. To eliminate this inconvenience, a thin membrane having pre-existing FDA approval is used. Additionally, the implementation of a thin membrane may be more cost effective than the implementation of a compatible isolation medium. Generally, thin membranes may be cheaper to purchase and manufacture than isolation mediums. Generally, the thin membrane may lie across the top of the support structure and may be flexible and take the shape of the isolation medium.

To ensure the thin membrane is properly sealed to the support structure, a secondary seal may be used. Typically, the secondary seal (e.g. rubber gasket, o-ring, chevron seal, etc.) may be configured to fit within a gap/channel located around the top perimeter of the support structure. In some embodiments, the secondary seal may permanently press the thin membrane into the gap/channel (e.g. press fit, etc.) to ensure the thin membrane is locked in place. In some embodiments, the secondary seal may permanently press the thin membrane onto the support structure using an adhesive bond (e.g. epoxy, silicone, etc.), ultrasonic welding (e.g. vibrational energy used to generate heat, etc.), heat stake (e.g. thermal energy), and/or another method of permanent attachment. Additionally, the secondary seal may stretch the thin membrane uniformly in each direction from a center of the isolation medium, and the secondary seal may substantially remove the air between the thin membrane (e.g., when the thin membrane is non-permeable) and the isolation medium. In this disclosure, "permanently" and/or "permanent" means that it may be possible to use force to pull the secondary seal off of the support structure resulting in the removal of the thin membrane. However, this method of removal may effectively damage the force sensor assembly, the thin membrane, the secondary seal, and/or the support structure so that the corresponding element cannot be reused. In other words, removal of the thin membrane may be difficult to accomplish (e.g. requiring tools). In this case, "permanently" and/or "permanent" means that it would be very inconvenient to remove the secondary seal from the support structure (e.g. not easily done) without rendering the feature unsuitable for its intended purpose. Typically, permanent attachment of the thin membrane to the force sensor assembly may prove beneficial for high volume uses involving force sensors for a particular application (without wanting to handle the inconvenience of obtaining FDA approval and recertification of the isolation medium).

In some embodiments, the force sensor assembly may allow removable attachment of the thin membrane. Typically, the configuration of the force sensor assembly may be similar to the force sensor assembly for permanent attachment of the thin membrane. Typically, the secondary seal may be a gasket which may fit around the perimeter of the support structure. Typically, the support structure may comprise a raised central area with the circumference of the support structure lowered to allow the rubber gasket to fit snugly and removably around the raised central area. In this manner, the secondary seal may press the thin membrane snugly onto the support structure. To provide an additional barrier to prevent contact between the isolation medium and the external medium, a locking element may be placed around the circumference of the support structure. Generally, the locking element may cover the secondary seal and the sides of the support structure. Additionally, the locking element may lay flush with the thin membrane. To lock the locking element into place, several different kinds of locking methods may be implemented. For example, the locking element may comprise a snap-fit, press-fit, or screw mechanism to attach to the support structure. It should be appreciated that other methods of removably attaching the locking element to the support structure are also possible.

In some embodiments, the thin membrane and the locking element may be integrated together to reduce the number of pieces. In other words, during replacement, both the locking element and the thin membrane can be replaced. However, to increase cost efficiency, the locking element may be reusable while the thin membrane may be disposable. To reuse, the locking element can be cleaned in case it comes into contact with the external medium. In some embodiments, the locking element may not lay flush with the thin membrane to prevent it from being exposed to the external medium during use (in other words, the locking element may not need to be cleaned depending on the application). Additionally, during replacement of the thin membrane, a user may remove (e.g. by pulling with fingers) the secondary seal from the support structure to replace the thin membrane. Typically, removable attachment of the thin membrane to the force sensor assembly may prove beneficial for users who deal with varying applications (e.g. different patients, different external mediums, etc.) or for users who may want to implement the force sensor assembly for individual use at home (e.g. home medical market).

In some embodiments, the substrate of the force sensor assembly may comprise an aperture. Typically, the aperture may be smaller than the central aperture of the support structure and may align with the central aperture of the support structure. Generally, the force sensor assembly may comprise a sense element which may be affixed to a first side of the substrate (e.g. on a same side as the support structure) and be affixed to the substrate with the support structure surrounding the sense element. Typically, the sense element may be configured to electrically connect to electrical traces located on the substrate. In some embodiments, the sense element may comprise a diaphragm formed on a sense die. In this case, the diaphragm may lie above the aperture of the substrate in a manner such that the isolation medium may not enter within the cavity formed between the diaphragm and the aperture of the substrate. The aperture in the substrate may serve as a pressure path to allow a differential pressure to be sense across the sense element. In some embodiments, the sense element may not necessarily comprise a diaphragm. In this case, typically, the sense element may comprise a slab die which may be affixed to the first side of the substrate in direct contact with the isolation medium. In this manner, the isolation medium may be located within the space in the central aperture of the support structure and may interface with the top of the sense element.

In some embodiments, the sense element may be affixed to a second side of the substrate opposite the side of the support structure. Typically, the sense element may comprise a diaphragm and a sense die. Typically, the sense die may be held onto the force sensor assembly by the diaphragm. In this manner, the diaphragm may surround the sense die of the sense element. Additionally, the diaphragm may encompass the aperture in the substrate. Thus, the isolation medium may be located within the space in the central aperture of the support structure, the space within the aperture of the substrate, and the space between the diaphragm and the substrate. With this configuration, when the User may press the thin membrane against an external medium, the thin membrane may transfer a force to the isolation medium. Typically, the isolation medium may transfer a force (through the central aperture of the support structure, through the aperture of the substrate, and into the cavity between the diaphragm and the substrate) to the sense element and cause the sense element to deflect. Generally, the sense element may transmit an output signal relating the deflection of the sense element to the amount of force being sensed. Additionally, in some embodiments, the substrate may be configured for interaction with various different external electrical connections (e.g. dual in-line package (DIP), single in-line package (SIP), cable, etc.). Typically, the electrical traces on the substrate may electrically connect with at least one of the external electrical connections.

Some embodiments of the force sensor assembly may comprise an additional external attachment element. Typically, the external attachment element may attach to the force sensor assembly using a mechanical gasket (e.g., O-ring). The mechanical gasket may be located directly above or directly below the thin membrane so as to attach to a gap/channel on the external attachment element and/or the support structure. Typically, the mechanical gasket may fit snugly within the external attachment element to prevent interaction between the isolation medium and the external medium. Additionally, a snug fit between the force sensor assembly and the external attachment element may be required to ensure no external elements (e.g. pressure/force due to surrounding ambient environment) are affecting the output signal of the sense element.

In some embodiments, the locking element may comprise an attachment feature. More specifically, the locking element may be configured to fit on top of and around the support element. Typically, the locking element may be attached to the support structure using methods such as press-fit, snap-fit, screw, etc. The attachment feature may be part of the locking element and, in some embodiments, may be tubular. Typically, the attachment feature may comprise a longitudinal bore/through-hole, which can be centered on the centerline of the attachment feature. Generally, the attachment feature may comprise a sidewall aperture which may be configured to lay adjacent to and surround/encompass the thin membrane of the force sensor assembly. In this manner, the user may attach external attachment elements such as a tube to the outer/distal ends of the attachment feature. Typically, this configuration may be used in fluid delivery pumps to determine the volume of fluid and the force at which the fluid is being delivered. In some embodiments, the force sensor assembly may vary in size. In other words, the diameter of the u support element, the size of the substrate, the size of the sense element, and other parameters of the elements of the force sensor assembly may vary depending on the size of the external attachment element and/or the type of application. While persons of skill should understand the disclosed embodiments based on the above disclosure, the following figures may provide specific examples that may further clarify the disclosure.

Figure 1A:
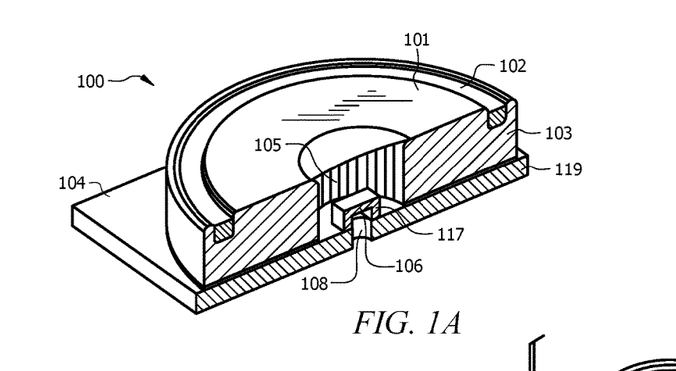
FIG. 1A illustrates a cross-sectional view of an exemplary embodiment of a force sensor assembly comprising permanent attachment of a thin membrane to a support structure using a secondary seal and further comprising an isolation medium, a sense element, and a substrate.

Turning now to the drawings, FIG. 1A illustrates a cross-sectional view of an exemplary embodiment of a force sensor assembly 100 comprising permanent attachment of a thin membrane 101 to a u support structure 103 comprising a secondary seal 102, an isolation medium 105, a sense element 117, and a substrate 104. In the exemplary embodiment of FIG. 1A, the support structure 103 is affixed to the substrate 104 and is shown to comprise a central aperture/through-hole. The support structure 103 can be in the form of a ring as shown in FIG. 1A, though other geometries are also possible. Additionally, in the exemplary embodiment of FIG. 1A, the sense element 117 is shown to be located within the central aperture/through-hole of the support structure 103 and above the aperture 108 of the substrate 104. Typically, the aperture 108 within the substrate 104 may be smaller than the central aperture/through-hole of the support structure 103 as shown in FIG. 1A. Additionally, the aperture 108 within the substrate 104 and the central aperture/through-hole of the support structure 103 may be concentric.

In some embodiments, as in the embodiment shown in FIG. 1A, the sense element 117 may comprise a diaphragm 106. The sensing elements on the diaphragm may be located on a side of the diaphragm 106 interfacing with the isolation medium 105 and adjacent to the substrate 104. Typically, the cavity formed between the sense element 117 and the substrate 104 may not comprise the isolation medium 105. The aperture 108 in the substrate 104 may allow fluid communication between the cavity and the ambient environment and/or with a reference pressure cavity or connection (e.g., a vacuum reference, atmospheric reference, or other reference). In this manner, the aperture 108 may be configured to serve as a pressure path to ensure accurate readings by the sense element 117 of the force sensor assembly 100. Typically, when the force sensor assembly 100 interacts with the external medium, the isolation medium 105 may be compressed, thereby allowing the force to be transmitted to and sensed by the sense element 117. Typically, the sense element 117 may electrically communicate with the electrical traces 119 on the substrate 104. The electrical traces 119 may be configured for interaction with various different external electrical connections (e.g. dual in-line package (DIP), single in-line package (SIP), cable, etc.) and/or processing circuitry on the substrate (e.g., an ASIC, amplifier, comparator, etc.).

In the exemplary embodiment of FIG. 1A, the force sensor assembly 100 further comprises a thin membrane 101. The thin membrane 101 prevents direct contact between the isolation medium 105 and the external medium. Additionally, the thin membrane 101 may function to eliminate material compatibility issues (e.g. between the isolation medium 105 and the external medium) by being formed from a compatible membrane material with pre-existing data to establish suitability for the desired application. Typically, the thin membrane 101 may lie across the top of the support structure 103. Typically, the thin membrane 101 may provide a more robust interface, may be flexible allowing it to take shape of the isolation medium 105, and may be non-permeable to prevent interaction between the isolation medium 105 and the external medium. To ensure the thin membrane 101 is properly sealed to the support structure 103, the secondary seal 102 may be used. Typically, the secondary seal 102 (e.g. rubber gasket) may be configured to fit within a gap/channel located around the top perimeter of the support structure 103. In the embodiment of FIG. 1A, the secondary seal 102 may permanently press the thin membrane 101 into the gap/channel of the support structure 103 to ensure the thin membrane 101 is locked in place. Typically, the secondary seal 102 may stretch the thin membrane 101 uniformly in each direction from a center of the isolation medium 105, and it may substantially remove the air between the thin membrane 101 and the isolation medium 105.

Figure 1B:
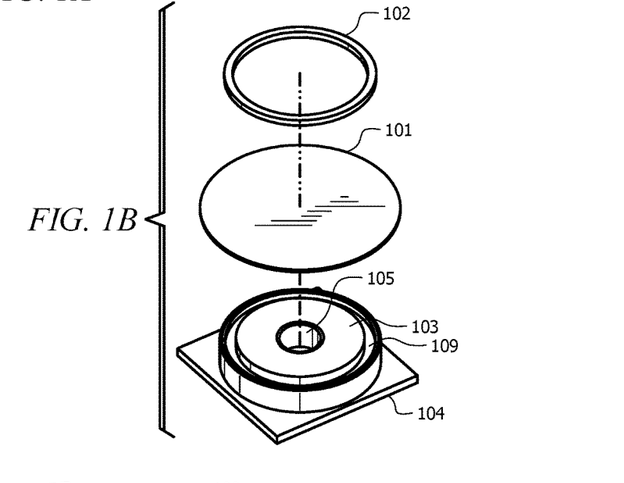
FIG. 1B illustrates an exploded view of an exemplary embodiment of a force sensor assembly (similar to the exemplary embodiment shown in FIG. 1A)

FIG. 1B illustrates an exploded view of an exemplary embodiment of a force sensor assembly 100 (similar to the exemplary embodiment shown in FIG. 1A) comprising a secondary seal 102, a thin membrane 101, a support structure 103, a substrate 104, and an isolation medium 105. The elements/parts of the force sensor assembly 100 function in a similar manner as those shown in FIG. 1A. In the embodiment of FIG. 1B, it may be more clearly shown that the thin membrane 101 is generally larger in area than the support structure 103, and the secondary seal 102 may be configured to fit snugly within the gap/channel 109 of the support structure 103. Typically, the secondary seal 102 may press down on the thin membrane 101 until it snaps within the gap/channel 109 of the support structure 103.

Figure 1C:
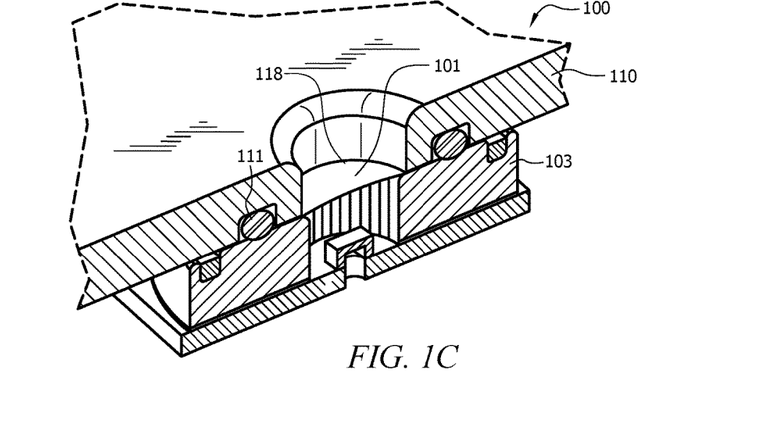
FIG. 1C illustrates a cross-sectional view of an exemplary embodiment of a force sensor assembly (similar to the exemplary embodiment shown in FIG. 1A and FIG. 1B) removably attached to an external attachment element.

FIG. 1C illustrates a cross-sectional view of an exemplary embodiment of a force sensor assembly 100 similar to the exemplary embodiment shown in FIG. 1A and FIG. 1B that is removably attached to an external attachment element 110. The exemplary embodiment shown in FIG. 1C may function similarly to the exemplary embodiment shown in FIG. 1A and FIG. 1B. Typically, for attachment of external attachment element 110, a gasket 111 such as an O-ring may be used to seal the external attachment element 110 to the force sensor assembly 100. The gasket 111 may be located directly above or directly below the thin membrane 101 so as to attach to a gap/channel on the external attachment element 110 and/or the support structure 103. For example, if the gasket 111 is affixed to the external attachment element 110, the support structure 103 may comprise an additional gap/channel so that the gasket 111 may press-fit into the gap/channel and prevent communication of external elements (e.g. air, external medium, etc.) with the force sensor assembly 100. On the other hand, if the gasket 111 is affixed to the support structure 103, the external attachment element 110 may comprise a gap/channel so that the gasket 111 may press-fit into the gap/channel and prevent communication of external elements (e.g. air, external medium, etc.) with the force sensor assembly 100.

Figures 2A, 2B:
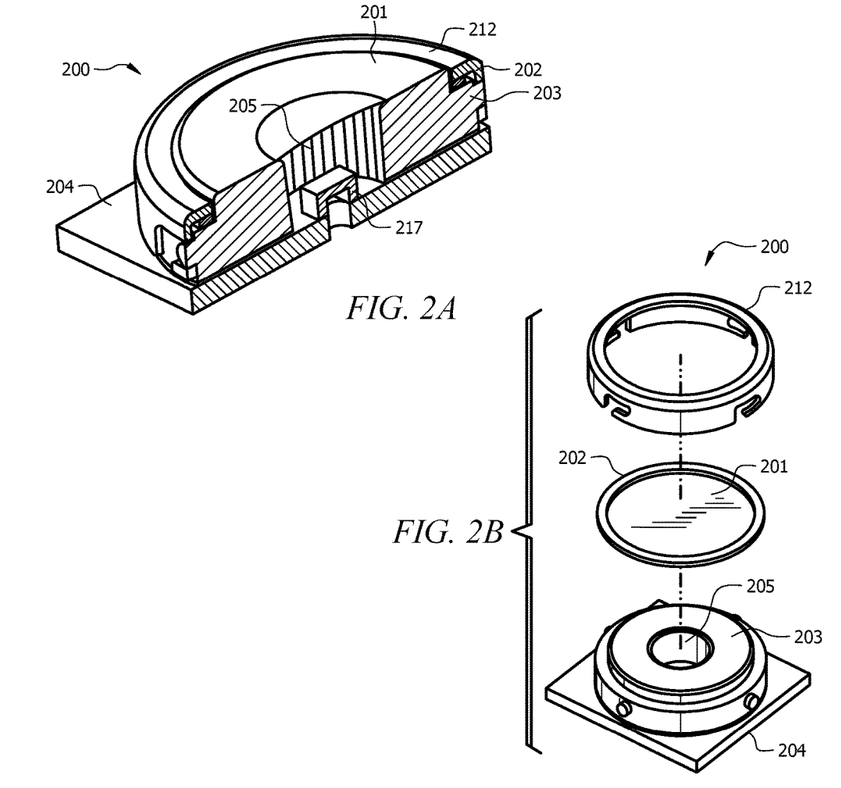
FIG. 2A illustrates a cross-sectional view of an exemplary embodiment of a force sensor assembly comprising removable attachment of a thin membrane to a support structure using a locking element and a secondary seal and further comprising an isolation medium, a sense element, and a substrate.
FIG. 2B illustrates an exploded view of an exemplary embodiment of a force sensor assembly (similar to the exemplary embodiment shown in FIG. 2A)

FIG. 2A illustrates a cross-sectional view of an exemplary embodiment of a force sensor assembly 200 comprising removable attachment of a thin membrane 201 to a support structure 203 comprising a locking element 212, a secondary seal 202, a substrate 204, an isolation medium 205, and a sense element 217. Typically, the elements of the exemplary force sensor assembly 200 shown in FIG. 2A are similar to the elements of the exemplary force sensor assembly 100 shown in FIG. 1A with the exception of the locking element 212. Typically, in a permanent attachment of the thin membrane 201 to the force sensor assembly 200 (as shown in FIG. 1A-FIG. 1C), the secondary seal 202 may fit within a gap/channel of the support structure 203. Typically, as shown in FIG. 2A, in a removable attachment of the thin membrane 201 to the force sensor assembly 200, the support structure 203 may not comprise a gap/channel. Generally, the support structure 203 may comprise a raised central area that can have a diameter less than the diameter of the support structure 203. Additionally, the support structure 203 may comprise a lowered portion around the circumference of the support structure 203 which may take up a certain width based on the desired application. Thus, the secondary seal 202 may fit snugly and removably within the lowered portion of the support structure 203 and around the raised central area. In this manner, the secondary seal 202 may press the thin membrane 201 snugly onto the support structure 203. To provide an additional barrier to prevent contact between the isolation medium 205 and the external medium, a locking element 212 may be placed around the circumference of the support structure 203. Generally, the locking element 212 may cover the secondary seal 202 and the sides of the support structure 203. Additionally, the locking element 212 may lay flush with the thin membrane 201. To lock the locking element 212 into place, several different kinds of locking methods may be implemented. For example, the locking element 212 may comprise a snap-fit, press-fit, or screw mechanism to attach the locking element to the support structure 203. Persons of skill should appreciate other methods of removably attaching the locking element 212 to the support structure 203. Additionally, in the exemplary embodiment of FIG. 2A, the locking element 212 and the thin membrane 201 may be integrated together to reduce the number of pieces from two to one. In other words, during replacement, the user may dispose of both the locking element 212 and the thin membrane 201. However, to increase cost efficiency, the locking element 212 may be reusable while the thin membrane 201 may be disposable. To reuse, the user may clean the locking element 212 in case it came into contact with the external medium. In some embodiments, only the thin membrane 201 may be allowed to contact a fluid of interest so that the locking element 212 may not need to be cleaned. Additionally, during replacement of the thin membrane 201, the user may remove (e.g. by pulling with fingers) the secondary seal 202 from the support structure 203 to replace the thin membrane 201.

FIG. 2B illustrates an exploded view of an exemplary embodiment of a force sensor assembly 200 (similar to the exemplary embodiment shown in FIG. 2A) comprising a locking element 212, a secondary seal 202, a thin membrane 201, a support structure 203, a substrate 204, and an isolation medium 205. The elements/parts of the force sensor assembly 200 function in a similar manner as those shown in FIG. 2A. In the embodiment of FIG. 2B, it is shown that the thin membrane 201 and the secondary seal 202 are joined/integrated together. This may make it easier to replace (e.g. attach and detach) the thin membrane 201 to the support structure 203. Additionally, the user may not have to deal with the complications of properly sealing the thin membrane 201 to the support structure 203. Typically, the secondary seal 202 and the thin membrane 201 may be pressed snugly onto the support structure 203. The locking element 212 may provide more support to hold the thin membrane 201 in place. Additionally, the locking element 212 may comprise a locking mechanism to allow snap-fit of the locking element 212 to the support structure 203. Persons of skill should appreciate other methods of removably locking the locking element 212 to the force sensor assembly 200.

Figure 2C:
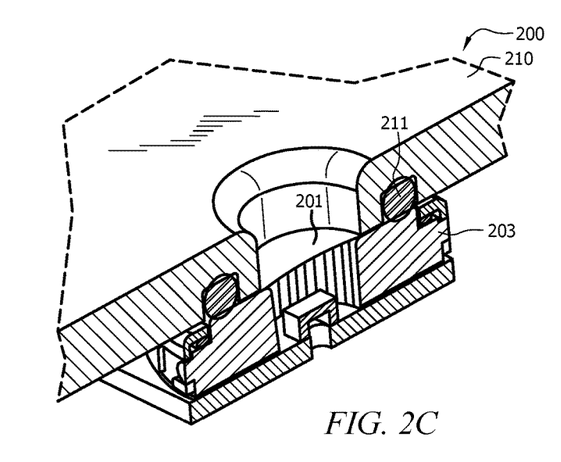
FIG. 2C illustrates a cross-sectional view of an exemplary embodiment of a force sensor assembly (similar to the exemplary embodiment shown in FIG. 2A and FIG. 2B) removably attached to an external attachment element.

FIG. 2C illustrates a cross-sectional view of an exemplary embodiment of a force sensor assembly 200 (similar to the exemplary embodiment shown in FIG. 2A and FIG. 2B) removably attached to an external attachment element 210. The exemplary embodiment shown in FIG. 2C may function similarly to the exemplary embodiments shown in FIG. 2A and FIG. 2B. Typically, for attachment of external attachment element 210, a gasket 211 (e.g. O-ring) may be used to seal the external attachment element 210 to the force sensor assembly 200. The gasket 211 may be located directly above or directly below the thin membrane 201 so as to attach to a gap/channel on the external attachment element 210 and/or the support structure 203. For example, if the gasket 211 is affixed to the external attachment element 210, the support structure 203 may comprise an additional gap/channel so that the gasket 211 may press-fit into the gap/channel and prevent communication of external elements (e.g. air, external medium, etc.) with the force sensor assembly 200. On the other hand, if the gasket 211 is affixed to the support structure 203, the external attachment element 210 may comprise a gap/channel so that the gasket 211 may press-fit into the gap/channel and prevent communication of external elements (e.g. air, external medium, etc.) with the force sensor assembly 200.

Figures 3A, 3B:
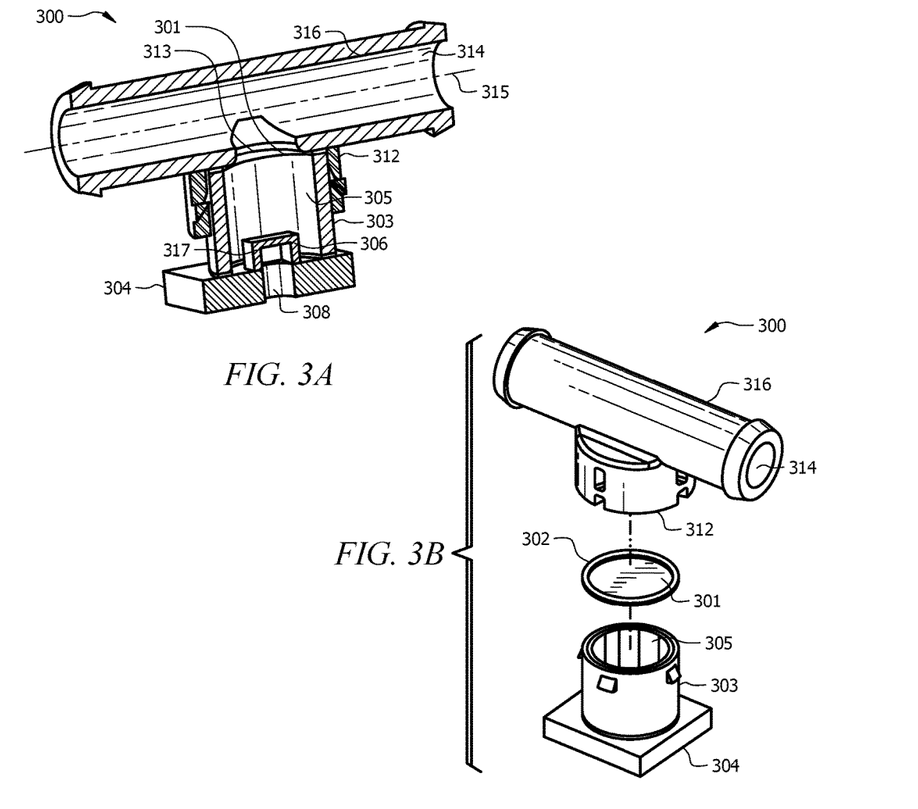
FIG. 3A illustrates a cross-sectional view of an exemplary embodiment of a force sensor assembly comprising an attachment feature, a locking element, a support structure, a secondary seal, a thin membrane, an isolation medium, a substrate, and a sense element.
FIG. 3B illustrates an exploded view of an exemplary embodiment of a force sensor assembly (similar to the exemplary embodiment shown in FIG. 3A)

FIG. 3A illustrates a cross-sectional view of an exemplary embodiment of a force sensor assembly 300 comprising an attachment feature 316, a locking element 312, a support structure 303, a secondary seal, a thin membrane 301, an isolation medium 305, a substrate 304, and a sense element 317. Typically, the configuration of the force sensor assembly 300 may be similar to the exemplary embodiments shown in FIG. 1A-FIG. 2C. In the exemplary embodiment shown in FIG. 3A, the support structure 303 varies in size. The support structure 303 is shown to have a smaller diameter and a longer length (e.g. protrudes outward from the substrate 304 more than the support structure shown in the exemplary embodiments of FIG. 1A-FIG. 2C). Typically, the sizing (e.g. length, diameter, thickness, etc.) of the support structure 303 may vary depending on the desired application. In the exemplary embodiment of FIG. 3A, the locking element 312 and the attachment feature 316 are shown to be integrated into one piece. Typically, the locking element 312 may clasp (e.g. snap-fit) onto the support structure 303. Persons of skill should appreciate alternative methods of removably attaching the locking element 312 to the support structure 303. Typically, the interface between the support structure 303 and the locking element 312 may comprise the thin membrane 301, and, in some embodiments, the interface may further comprise a secondary seal. The secondary seal may function to prevent interaction of the isolation medium 305 with external elements (e.g. air, external medium, etc.) which may interfere with the force readings by the sense element 317. In the exemplary embodiment of FIG. 3A, the attachment feature 316 is shown to be tubular and comprises a longitudinal bore/through-hole 314, which can be centered on the centerline 315 of the attachment feature 316. Generally, the attachment feature 316 may comprise a sidewall aperture 313 which may be configured to lay adjacent to and surround/encompass the thin membrane 301 of the force sensor assembly 300 as shown in FIG. 3A. Typically, an external medium may flow through the longitudinal bore/through-hole 314 of the attachment feature 316 causing the thin membrane 301 to flex inward towards the sense element 317. The deflection of the thin membrane 301 may cause the isolation medium 305 to deflect causing the sense element 317 to deflect in response and register a force. In this manner, the exemplary force sensor assembly 300 shown in FIG. 3A may measure force and the isolation medium 305 may not make direct contact with the external medium. Additionally, as shown in FIG. 3A, the sense element 317 may comprise a diaphragm 306. Typically, the diaphragm 306 may be affixed to a first side (e.g. same side as the support structure 303) of the substrate 304. The diaphragm may deflect in response to a change in pressure/force and send output signals to the electrical traces located on the substrate 304.

FIG. 3B illustrates an exploded view of an exemplary embodiment of a force sensor assembly 300 (similar to the exemplary embodiment shown in FIG. 3A) comprising an attachment feature 316, a locking element 312, a thin membrane 301, a secondary seal 302, an isolation medium 305, a support structure 303, and a substrate 304. The elements/parts of the force sensor assembly 300 function in a similar manner as those shown in FIG. 3A. In the embodiment of FIG. 3B, it is shown that the attachment feature 316 is tubular having a longitudinal bore/through-hole 314. Typically, the attachment feature 316 may attach to the locking element 312 (e.g. may be manufactured such that the attachment feature 316 and the locking element 312 are conjoined). Typically, the attachment feature 316 may be attached to the locking element 312 in a manner such that no air or external elements enter into the force sensor assembly 300 other than from the two distal ends of the longitudinal bore/through-hole 314. Additionally, the locking element 312 may comprise one or more apertures to allow entry of the projections located on the support structure 303 to lock the locking element 312 to the support structure 303. This method of attachment may be known as snap-fit. Other methods of attachment may also be used such as press-fit, screw, etc. Persons of skill should appreciate other methods of removable attachment of the support structure 303 to the locking element 312 to form the force sensor assembly 300.

In the exemplary embodiment of FIG. 3B, it is shown that the thin membrane 301 and the secondary seal 302 are joined/integrated together. This may make it easier to replace (e.g. attach and detach) the thin membrane 301 to the support structure 303. Additionally, the User may not have to deal with the complications of properly sealing the thin membrane 301 to the support structure 303. Typically, the secondary seal 302 and the thin membrane 301 may be pressed snugly onto the support structure 303. The locking element 312 may provide more support to hold the thin membrane 301 in place. In some embodiments, the thin membrane 301 and the secondary seal 302 may not be attached together. In this case, once the thin membrane 301 may be placed on top of the support structure 303 containing the isolation medium 305, the secondary seal 302 may be placed on top of the thin membrane 301. Typically, the isolation medium 305 may project out of the support structure 303 to form a raised surface to interact with the external medium (in this manner, the outside edges of the support structure 303 may not interfere with the deflection of the isolation medium 305 in measuring force).

Figure 3C:
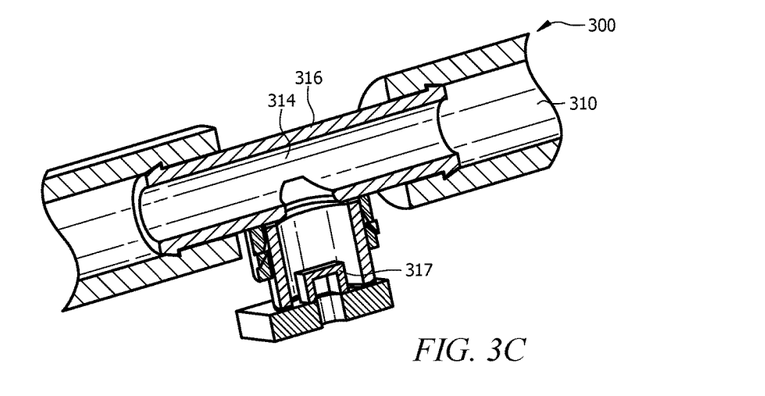
FIG. 3C illustrates a cross-sectional view of an exemplary embodiment of a force sensor assembly (similar to the exemplary embodiment shown in FIG. 3A and FIG. 3C) removably attached to an external attachment element using the attachment feature.

FIG. 3C illustrates a cross-sectional view of an exemplary embodiment of a force sensor assembly 300 (similar to the exemplary embodiment shown in FIG. 3A and FIG. 3B) removably attached to an external attachment element 310 using the attachment feature 316. Typically, an external attachment element 310 such as a flexible tube may be configured to snugly stretch around the distal ends of the attachment feature 316 so as to allow communication of the external medium into the longitudinal bore/through-hole 314 of the attachment feature 316. Generally, the disclosed force sensor assembly 300 may be used in fluid delivery pumps. Typically, the fluid may flow into the attachment feature 316 from the external attachment element 310. During flow of the fluid, the sense element 317 may determine the amount of fluid being delivered, the force/pressure at which the fluid is being delivered, and may keep track of the type of fluid being delivered to inform the patient and/or attendant (e.g. doctor, nurse, etc.). Additionally, depending on the application, the diameter of the tube may vary.

Figure 4A:
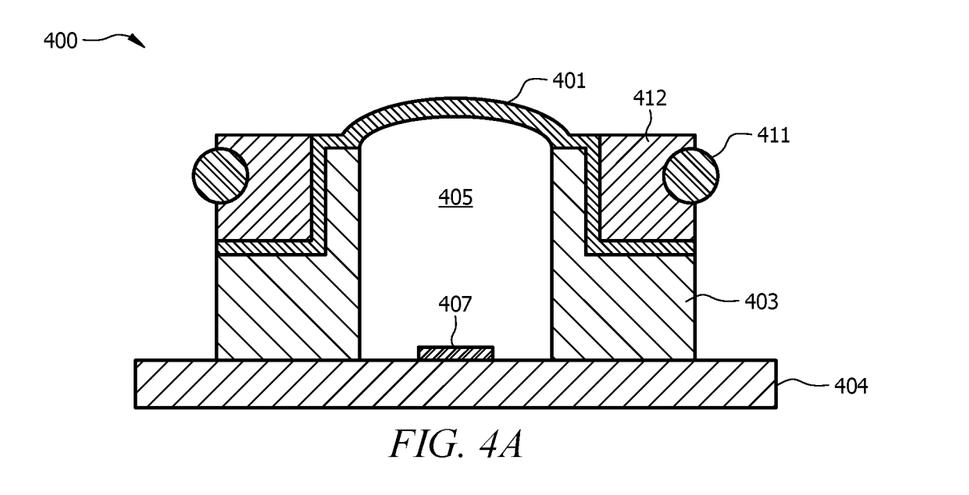
FIG. 4A illustrates a cross-sectional view of an exemplary embodiment of a conventional force sensor assembly retrofit to additionally comprise a thin membrane, a locking element, and a secondary seal.

FIG. 4A illustrates a cross-sectional view of an exemplary embodiment of a conventional force sensor assembly 400 retrofitted to additionally comprise a thin membrane 401, a locking element 412, and a mechanical gasket 411. Typically, conventional force sensor assemblies 400 comprise an isolation medium 405, a sense element 407, and a substrate 404, but do not comprise a thin membrane 401 to separate the isolation medium 405 from the external medium. Thus, typically, the isolation medium 405 may make direct contact with the external medium which may not be cost or time effective (because the isolation medium 305 must comply with FDA regulations and must be compatible with the external medium). The exemplary embodiment of FIG. 4A illustrates a method of retrofitting a conventional force sensor assembly 400 by snapping the thin membrane 401 onto the support structure 403. Typically, the thin membrane 401 may be set on top of the isolation medium 405, and the locking element 412 may fit on top of the thin membrane 401 so as to encompass the thin membrane 401 and tightly press the thin membrane 401 into place. Typically, the locking element 412 may comprise approximately the same diameter as the support structure 403 allowing it to snugly fit onto the force sensor assembly 400. Additionally, the outer circumference of the locking element 412 may comprise a mechanical gasket. In the exemplary embodiment of FIG. 4A, the mechanical gasket 411 is an O-ring. Typically, the O-ring may seal the interface between the force sensor assembly 400 and the external attachment element. Typically, the O-ring may be located within a gland located around the outer circumference of the locking element 412.

Figure 4B:
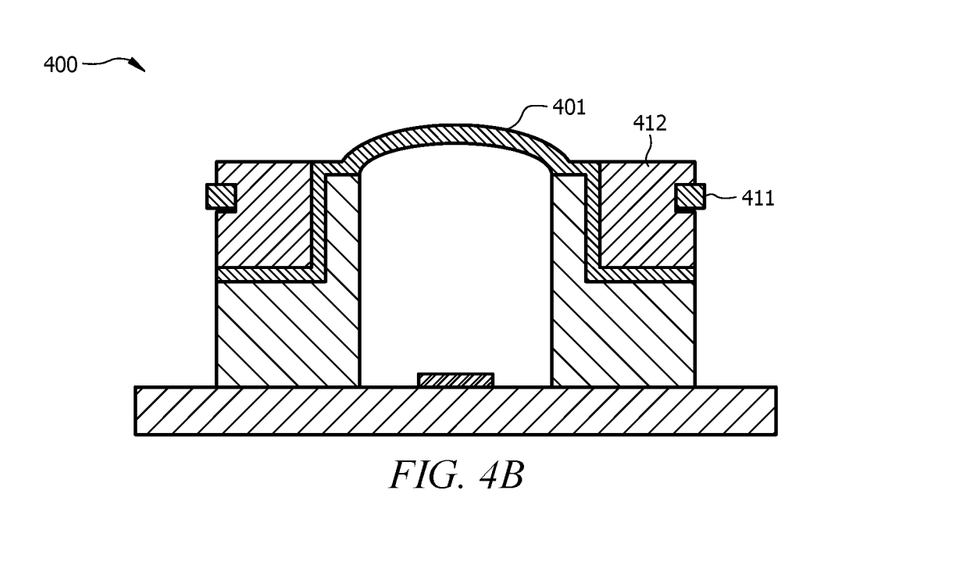
FIG. 4B illustrates a cross-sectional view of an exemplary embodiment of a conventional force sensor assembly retrofit to additionally comprise a thin membrane, a locking element, and a secondary seal (similar to the exemplary embodiment shown in FIG. 4A).

FIG. 4B illustrates a cross-sectional view of an exemplary embodiment of a conventional force sensor assembly 400 retrofit to additionally comprise a thin membrane 401, a locking element 412, and a mechanical gasket 411 (similar to the exemplary embodiment shown in FIG. 4A). The exemplary embodiment of FIG. 4B comprises a different mechanical gasket 411 compared to the exemplary embodiment of FIG. 4A. The exemplary embodiment of FIG. 4B comprises a rectangular gasket. Typically, the rectangular gasket may be placed within a gland located around the outer circumference of the locking element 412. In some embodiments, the rectangular gasket may be placed on top to serve as a face seal between the force sensor assembly 400 and the external attachment element.

Having described device embodiments above, especially with regard to the figures, various additional embodiments can include, but are not limited to the following:

In a first embodiment, a force sensor assembly comprising: a sense element; an isolation medium, wherein the isolation medium is configured to transfer a force to the sense element; a thin membrane, wherein the thin membrane is located adjacent to the isolation medium and is configured to provide a shield between an external medium and the isolation medium and transfer a force from the external medium to the isolation medium; and a substrate comprising electrical traces, wherein the sense element is electrically connected to the electrical traces on the substrate. A second embodiment can include the force sensor assembly of the first embodiment, wherein the isolation medium comprises a gel. A third embodiment can include the force sensor assembly of the first to second embodiments, wherein the substrate is formed from at least one of a ceramic or a laminated board. A fourth embodiment can include the force sensor assembly of the first to third embodiments, further comprising a support structure, wherein the support structure is secured to a first side of the substrate, and wherein the support structure is configured to enclose/surround/encompass the isolation medium. A fifth embodiment can include the force sensor assembly of the first to fourth embodiments, wherein the thin membrane is configured to lie between the support structure and the isolation medium. A sixth embodiment can include the force sensor assembly of the first to fifth embodiments, further comprising a secondary seal, wherein the secondary seal is configured to seal the thin membrane to the support structure. A seventh embodiment can include the force sensor assembly of the first to sixth embodiments, wherein the secondary seal is configured to (permanently/non-removably) press fit/interference fit within a gap/channel around the perimeter of the support structure. An eighth embodiment can include the force sensor assembly of the first to seventh embodiments, wherein the secondary seal is configured to press-fit with the support structure in a manner which allows the thin membrane to stretch uniformly in each direction from a center of the isolation medium, wherein the thin membrane takes on the shape of the isolation medium, and wherein the air between the thin membrane and the isolation medium is substantially removed. A ninth embodiment can include the force sensor assembly of the first to eighth embodiments, wherein the secondary seal and the thin membrane are fused together. A tenth embodiment can include the force sensor assembly of the first to ninth embodiments, wherein the thin membrane is replaceable/disposable (and the material of the thin membrane varies depending on the application of the force sensor assembly). An eleventh embodiment can include the force sensor assembly of the first to tenth embodiments, wherein the isolation medium is FDA compliant or an extensively tested gel complying with FDA standards. A twelfth embodiment can include the force sensor assembly of the first to eleventh embodiments, wherein the sense element is electrically connected to the electrical traces on the substrate using wire bonds. A thirteenth embodiment can include the force sensor assembly of the first to twelfth embodiments, wherein the sense element comprises a diaphragm, wherein the sense element is secured to a first and/or second side of the substrate, and wherein the sense element may be surrounded/enclosed by the support structure. A fourteenth embodiment can include the force sensor assembly of the first to thirteenth embodiments, wherein the sense element is configured to lay adjacent to the thin membrane, and wherein the sense element is configured to send an output signal to the substrate in response to a change in force. A fifteenth embodiment can include the force sensor assembly of the first to fourteenth embodiments, wherein the substrate comprises an aperture configured to allow fluid communication of the isolation medium between the thin membrane and the sense element and/or wherein the substrate comprises an aperture to form a pressure path between the sense element and the external environment and/or wherein the sense element lays adjacent to/surrounds the aperture within the substrate. A sixteenth embodiment can include the force sensor assembly of the first to fifteenth embodiments, further comprising a locking element, wherein the locking element is configured to allow replaceable/removable attachment of the thin membrane to the force sensor assembly. A seventeenth embodiment can include the force sensor assembly of the first to sixteenth embodiments, wherein the locking element (interfaces with the secondary seal and) encloses the outer perimeter of the support structure. An eighteenth embodiment can include the force sensor assembly of the first to seventeenth embodiments, wherein the locking element is configured to snap-fit onto the support structure. A nineteenth embodiment can include the force sensor assembly of the first to eighteenth embodiments, wherein the locking element is configured to clip onto the support structure. A twentieth embodiment can include the force sensor assembly of the first to nineteenth embodiments, wherein the locking element is set back from the thin membrane such that the thin membrane (slightly) projects outward from the force sensor assembly. A twenty-first embodiment can include the force sensor assembly of the first to twentieth embodiments, wherein the locking element is integrated with the thin membrane, and wherein the locking element and the thin membrane are disposable. A twenty-second embodiment can include the force sensor assembly of the first to twenty-first embodiments, wherein the locking element further comprises an attachment feature. A twenty-third embodiment can include the force sensor assembly of the first to twenty-second embodiments, wherein the attachment feature is tubular, wherein the attachment feature comprises a longitudinal bore/through-hole (centered around the centerline) and a sidewall aperture, and wherein the sidewall aperture is configured to lay adjacent to and surround/encompass the thin membrane of the force sensor assembly. A twenty-fourth embodiment can include the force sensor assembly of the first to twenty-third embodiments, further comprising a gasket configured to interface with an external attachment element (located in gland between the external attachment element and the locking element or located on top of the locking element).

Exemplary embodiments might also relate to a method for sensing force using a force sensor assembly (e.g. similar to those described above, which may be considered optionally incorporated herein with respect to the discussion of the system). Such method embodiments, for example, might include, but are not limited to, the following:

In a twenty-fifth embodiment a method for sensing force comprising: applying a force to a thin membrane of a force sensor assembly; transmitting the force through the thin membrane to an isolation medium in contact with the thin membrane; retaining the thin membrane in position relative to the isolation medium using a support structure; transferring the force from the isolation medium to a sense element of a force sensor; deflecting at least a portion of the sense element due to the force; generating an output signal from the sense element in response to the deflection of the sense element; and shielding the isolation medium from an environment using the thin membrane during the applying of the force. A twenty-sixth embodiment can include the method of the twenty-fifth embodiment, further comprising: removably detaching the thin membrane from the force sensor assembly; and removably attaching a new thin membrane to the force sensor assembly. A twenty-seventh embodiment can include the method of the twenty-fifth to twenty-sixth embodiments, wherein deflecting at least a portion of the sense element comprises compressing the thin membrane and the isolation medium. A twenty-eighth embodiment can include the method of the twenty-fifth to twenty-seventh embodiments, wherein the magnitude of the applied force is electrically communicated to the substrate by the sense element. A twenty-ninth embodiment can include the method of the twenty-fifth to twenty-eighth embodiments, wherein the force sensor assembly comprises: a sense element; an isolation medium, wherein the isolation medium is configured to transfer a force to the sense element; a thin membrane, wherein the thin membrane is located adjacent to the isolation medium and is configured to provide a shield between an external medium and the isolation medium and transfer a force from the external medium to the isolation medium; and a substrate comprising electrical traces, wherein the sense element is electrically connected to the electrical traces on the substrate. A thirtieth embodiment can include the method of the twenty-fifth to twenty-ninth embodiments, wherein the isolation medium comprises a gel. A thirty-first embodiment can include the method of the twenty-fifth to thirtieth embodiments, wherein the substrate is formed from at least one of a ceramic or a laminated board. A thirty-second embodiment can include the method of the twenty-fifth to thirty-first embodiments, further comprising a support structure, wherein the support structure is secured to a first side of the substrate, and wherein the support structure is configured to enclose/surround/encompass the isolation medium. A thirty-third embodiment can include the method of the twenty-fifth to thirty-second embodiments, wherein the thin membrane is configured to lie between the support structure and the isolation medium. A thirty-fourth embodiment can include the method of the twenty-fifth to thirty-third embodiments, further comprising a secondary seal, wherein the secondary seal is configured to seal the thin membrane to the support structure. A thirty-fifth embodiment can include the method of the twenty-fifth to thirty-fourth embodiments, wherein the secondary seal is configured to (permanently/non-removably) press fit/interference fit within a gap/channel around the perimeter of the support structure. A thirty-sixth embodiment can include the method of the twenty-fifth to thirty-fifth embodiments, wherein the secondary seal is configured to press-fit with the support structure in a manner which allows the thin membrane to stretch uniformly in each direction from a center of the isolation medium, wherein the thin membrane takes on the shape of the isolation medium, and wherein the air between the thin membrane and the isolation medium is substantially removed. A thirty-seventh embodiment can include the method of the twenty-fifth to thirty-sixth embodiments, wherein the secondary seal and the thin membrane are fused together. A thirty-eighth embodiment can include the method of the twenty-fifth to thirty-seventh embodiments, wherein the thin membrane is replaceable/disposable (and the material of the thin membrane varies depending on the application of the force sensor assembly). A thirty-ninth embodiment can include the method of the twenty-fifth to thirty-eighth embodiments, wherein the isolation medium is FDA compliant or an extensively tested gel complying with FDA standards. A fortieth embodiment can include the method of the twenty-fifth to thirty-ninth embodiments, wherein the sense element is electrically connected to the electrical traces on the substrate using wire bonds. A forty-first embodiment can include the method of the twenty-fifth to fortieth embodiments, wherein the sense element comprises a diaphragm, wherein the sense element is secured to a second side of the substrate. A forty-second embodiment can include the method of the twenty-fifth to forty-first embodiments, wherein the sense element is configured to lay adjacent to the thin membrane, and wherein the sense element is configured to send an output signal to the substrate in response to a change in force. A forty-third embodiment can include the method of the twenty-fifth to forty-second embodiments, wherein the substrate comprises an aperture configured to allow fluid communication of the isolation medium between the thin membrane and the sense element. A forty-fourth embodiment can include the method of the twenty-fifth to forty-third embodiments, further comprising a locking element, wherein the locking element is configured to allow replaceable/removable attachment of the thin membrane to the force sensor assembly. A forty-fifth embodiment can include the method of the twenty-fifth to forty-fourth embodiments, wherein the locking element (interfaces with the secondary seal and) encloses the outer perimeter of the support structure. A forty-sixth embodiment can include the method of the twenty-fifth to forty-fifth embodiments, wherein the locking element is configured to snap-fit onto the support structure. A forty-seventh embodiment can include the method of the twenty-fifth to forty-sixth embodiments, wherein the locking element is configured to clip onto the support structure. A forty-eighth embodiment can include the method of the twenty-fifth to forty-seventh embodiments, wherein the locking element is set back from the thin membrane such that the thin membrane (slightly) projects outward from the force sensor assembly. A forty-ninth embodiment can include the method of the twenty-fifth to forty-eighth embodiments, wherein the locking element is integrated with the thin membrane, and wherein the locking element and the thin membrane are disposable. A fiftieth embodiment can include the method of the twenty-fifth to forty-ninth embodiments, wherein the locking element further comprises an attachment feature. A fifty-first embodiment can include the method of the twenty-fifth to fiftieth embodiments, wherein the attachment feature is tubular, wherein the attachment feature comprises a longitudinal bore/through-hole (centered around the centerline) and a sidewall aperture, and wherein the sidewall aperture is configured to lay adjacent to and surround/encompass the thin membrane of the force sensor assembly. A fifty-second embodiment can include the method of the twenty-fifth to fifty-first embodiments further comprising a gasket configured to interface with an external attachment element (located in gland between the external attachment element and the locking element or located on top of the locking element).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A force sensor assembly comprising:
   a sense element;
   an isolation medium, wherein the isolation medium is configured to transfer a force to the sense element;
   a thin membrane, wherein the thin membrane is located adjacent to the isolation medium and is configured to provide a shield between an external medium and the isolation medium and transfer a force from the external medium to the isolation medium; and
   a substrate comprising electrical traces, wherein the sense element is electrically connected to the electrical traces on the substrate.

2. The force sensor assembly of claim 1, wherein the isolation medium comprises a gel.

3. The force sensor assembly of claim 1, wherein the substrate is formed from at least one of a ceramic or a laminated board.

4. The force sensor assembly of claim 1, further comprising a support structure, wherein the support structure is secured to a first side of the substrate, and wherein the support structure is configured to enclose the isolation medium.

5. The force sensor assembly of claim 4, wherein the thin membrane is configured to lay above the support structure and the isolation medium.

6. The force sensor assembly of claim 5, further comprising a secondary seal, wherein the secondary seal is configured to seal the thin membrane to the support structure.

7. The force sensor assembly of claim 6, wherein the secondary seal is configured to press-fit onto the support structure in a manner which allows the thin membrane to stretch uniformly in each direction from a center of the isolation medium, wherein the thin membrane takes on the shape of the isolation medium, and wherein the air between the thin membrane and the isolation medium is substantially removed.

8. The force sensor assembly of claim 6, wherein the secondary seal and the thin membrane are fused together.

9. The force sensor assembly of claim 1, wherein the thin membrane is disposable.

10. The force sensor assembly of claim 1, wherein the sense element is electrically connected to the electrical traces on the substrate using wire bonds.

11. The force sensor assembly of claim 3, wherein the sense element comprises a diaphragm, wherein the sense element is secured to the first side of the substrate, and wherein the sense element is surrounded by the support structure.

12. The force sensor assembly of claim 1, wherein the sense element is configured to lay adjacent to the isolation medium, and wherein the sense element is configured to send an output signal to the substrate in response to a change in force.

13. The force sensor assembly of claim 3, wherein the substrate comprises an aperture, and wherein the sense element lies adjacent to the aperture.

14. The force sensor assembly of claim 5, further comprising a locking element, wherein the locking element is configured to allow removable attachment of the thin membrane to the force sensor assembly, and wherein the locking element encloses the outer perimeter of the support structure.

15. The force sensor assembly of claim 14, wherein the locking element is configured to snap-fit, press-fit, clip, or screw onto the support structure.

16. The force sensor assembly of claim 15, wherein the locking element is set back from the thin membrane such that the thin membrane projects outward from the force sensor assembly.

17. The force sensor assembly of claim 15, wherein the locking element further comprises an attachment feature, wherein the attachment feature comprises a longitudinal bore and a sidewall aperture, and wherein the sidewall aperture is configured to lay adjacent to and surround/encompass the thin membrane of the force sensor assembly.

18. The force sensor assembly of claim 1, further comprising a gasket configured to interface with an external attachment element, wherein the gasket is located in a gland between the external attachment element and the locking element, on top of the locking element, or on top of the support structure.

19. A method of sensing force comprising:
applying a force to a thin membrane of a force sensor assembly;
transmitting the force through the thin membrane to an isolation medium in contact with the thin membrane;
retaining the thin membrane in position relative to the isolation medium using a support structure;
transferring the force from the isolation medium to a sense element of a force sensor;
deflecting at least a portion of the sense element due to the force;
generating an output signal from the sense element in response to the deflection of the sense element; and
shielding the isolation medium from an environment using the thin membrane during the applying of the force.

20. The method of claim 19, further comprising:
removably detaching the thin membrane from the force sensor assembly; and
removably attaching a new thin membrane to the force sensor assembly.

* * * * *